United States Patent
Karls et al.

(10) Patent No.: US 9,408,189 B2
(45) Date of Patent: *Aug. 2, 2016

(54) RADIO COMMUNICATION DEVICE AND METHOD FOR CONTROLLING FREQUENCY SELECTION

(71) Applicant: Intel Mobile Communications GmbH, Neubiberg (DE)

(72) Inventors: Ingolf Karls, Feldkirchen (DE); Elias Bjarnason, Grasbrunn (DE)

(73) Assignee: Intel Deutschland GmbH, Neubiberg (DE)

( * ) Notice: Subject to any disclaimer, the term of this patent is extended or adjusted under 35 U.S.C. 154(b) by 187 days.

This patent is subject to a terminal disclaimer.

(21) Appl. No.: 14/013,200

(22) Filed: Aug. 29, 2013

(65) Prior Publication Data

US 2014/0023017 A1 Jan. 23, 2014

Related U.S. Application Data

(63) Continuation of application No. 11/876,234, filed on Oct. 22, 2007, now Pat. No. 8,548,482.

(51) Int. Cl.
*H04W 72/04* (2009.01)
*H04W 80/00* (2009.01)
(Continued)

(52) U.S. Cl.
CPC .......... *H04W 72/04* (2013.01); *H04W 72/0453* (2013.01); *H04W 72/0406* (2013.01); *H04W 80/00* (2013.01); *H04W 84/10* (2013.01); *H04W 88/06* (2013.01); *H04W 88/10* (2013.01)

(58) Field of Classification Search
CPC .................................................... H04W 72/04

USPC ......................................................... 370/329
See application file for complete search history.

(56) References Cited

U.S. PATENT DOCUMENTS 6,175,738 B1    1/2001  Flake et al.
6,388,996 B1 *  5/2002  Biedermann et al. ......... 370/280
(Continued)

FOREIGN PATENT DOCUMENTS

EP      1489788 A2    12/2004
WO      96/29832 A1    3/1996
(Continued)

OTHER PUBLICATIONS

European Search Report received for European Patent Application No. EP14163713.2, mailed on Jun. 3, 2014, 12 pages.
(Continued)

*Primary Examiner* — Brandon Renner
*Assistant Examiner* — Abdullahi Ahmed
(74) *Attorney, Agent, or Firm* — Schiff Hardin LLP

(57) ABSTRACT

Embodiments of the invention relate generally to radio communication devices and to a method for controlling frequency selection. In an embodiment of the invention, a radio communication device is provided. The radio communication device may include a first medium access control unit, a second medium access control unit, a common scheduling unit configured to control the first medium access control unit and the second medium access control unit, and a communication interface configured for frequency selection communication between the first medium access control unit and the second medium access control unit, wherein at least one frequency channel to be used is exchanged between the first medium access control unit and the second medium access control unit.

17 Claims, 8 Drawing Sheets

(51) Int. Cl.
*H04W 84/10* (2009.01)
*H04W 88/10* (2009.01)
*H04W 88/06* (2009.01)

(56) References Cited

U.S. PATENT DOCUMENTS

| | | |
|---|---|---|
| 6,434,183 B1 | 8/2002 | Kockman et al. |
| 6,928,266 B1 | 8/2005 | Nevo et al. |
| 7,016,396 B2 | 3/2006 | Agrawal et al. |
| 7,075,915 B1 | 7/2006 | Gustke |
| 7,228,103 B2 | 6/2007 | Nowlin |
| 7,406,296 B2 | 7/2008 | Haartsen |
| 7,634,231 B2 | 12/2009 | Hundal |
| 7,734,311 B2 | 6/2010 | Satou |
| 8,112,094 B1 | 2/2012 | Wellington |
| 8,180,298 B2 | 5/2012 | Drude |
| 8,548,482 B2 * | 10/2013 | Karls et al. .......... 455/450 |
| 2002/0024937 A1 | 2/2002 | Barnard et al. |
| 2003/0083095 A1 | 5/2003 | Liang |
| 2003/0091096 A1 | 5/2003 | Agrawal et al. |
| 2003/0125019 A1 | 7/2003 | Bajikar |
| 2003/0206543 A1 | 11/2003 | Fischer et al. |
| 2004/0025047 A1 | 2/2004 | Mayne et al. |
| 2004/0219948 A1 | 11/2004 | Jones et al. |
| 2004/0259563 A1 | 12/2004 | Morton et al. |
| 2005/0117546 A1 | 6/2005 | Lioy et al. |
| 2005/0215197 A1 | 9/2005 | Chen et al. |
| 2006/0056341 A1 | 3/2006 | Takagi et al. |
| 2006/0135067 A1 | 6/2006 | Dunko |
| 2006/0154691 A1 | 7/2006 | Tang et al. |
| 2006/0268779 A1 | 11/2006 | Exeler et al. |
| 2006/0274704 A1 | 12/2006 | Desai et al. |
| 2006/0292986 A1 | 12/2006 | Bitran et al. |
| 2007/0082637 A1 | 4/2007 | Nam |
| 2007/0149187 A1 | 6/2007 | Levy |
| 2008/0002623 A1 * | 1/2008 | Piipponen et al. .......... 370/331 |
| 2008/0089277 A1 * | 4/2008 | Alexander et al. .......... 370/328 |
| 2008/0207259 A1 | 8/2008 | Rofougaran |
| 2008/0305792 A1 | 12/2008 | Khetawat et al. |
| 2009/0016245 A1 | 1/2009 | Karls |
| 2009/0088089 A1 | 4/2009 | Chandra et al. |
| 2009/0318087 A1 | 12/2009 | Mattila et al. |
| 2010/0115528 A1 * | 5/2010 | Piipponen et al. .......... 718/104 |

FOREIGN PATENT DOCUMENTS

| | | |
|---|---|---|
| WO | WO 2004/028057 A2 | 4/2004 |
| WO | WO 2005/020518 A1 | 3/2005 |
| WO | 2006/060245 A2 | 6/2006 |

OTHER PUBLICATIONS

Dr. Andreas Mueller, Hoeft & Wessel AG; "CLDPS-Verbindurgsclose Datenuebertragung ueber DECT".
ETSI EN 300 175-3 v2.1.1 (Aug. 2007) European Standard (Telecommunications series); Digital Enhanced Cordless Telecommunications (DECT); Common Interface (CI); Part 3: Medium Access Control (MAC) layer.

* cited by examiner

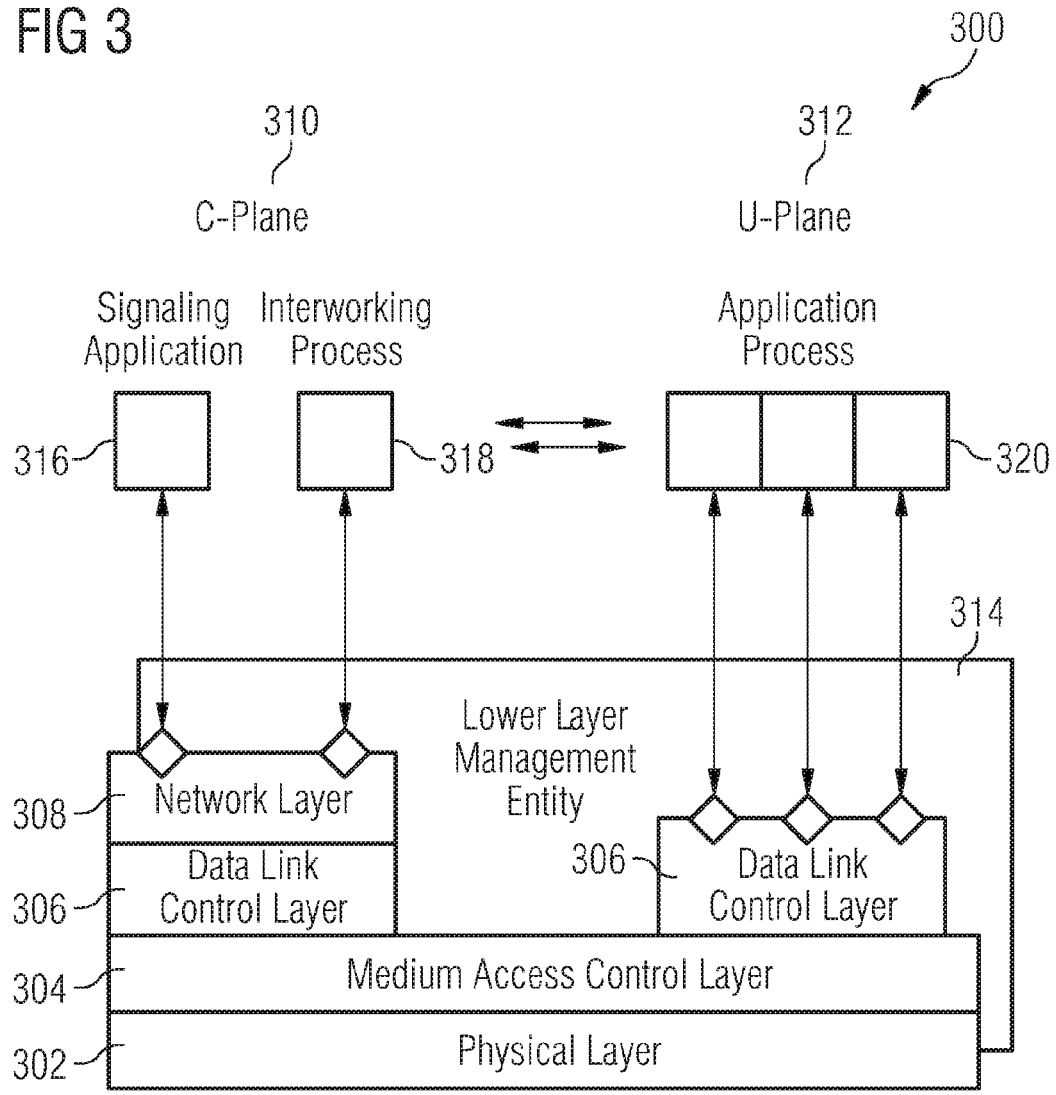

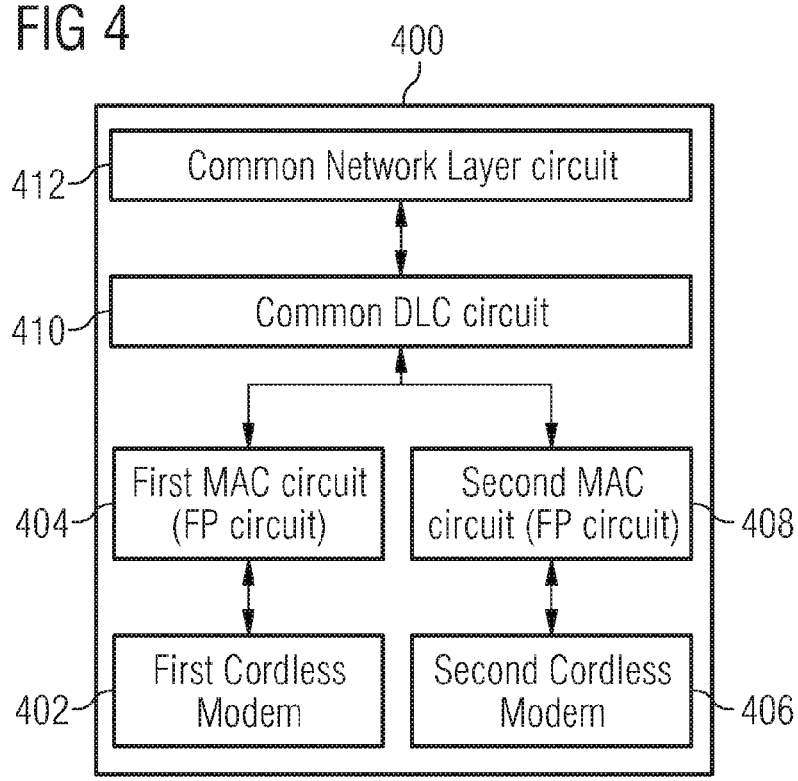
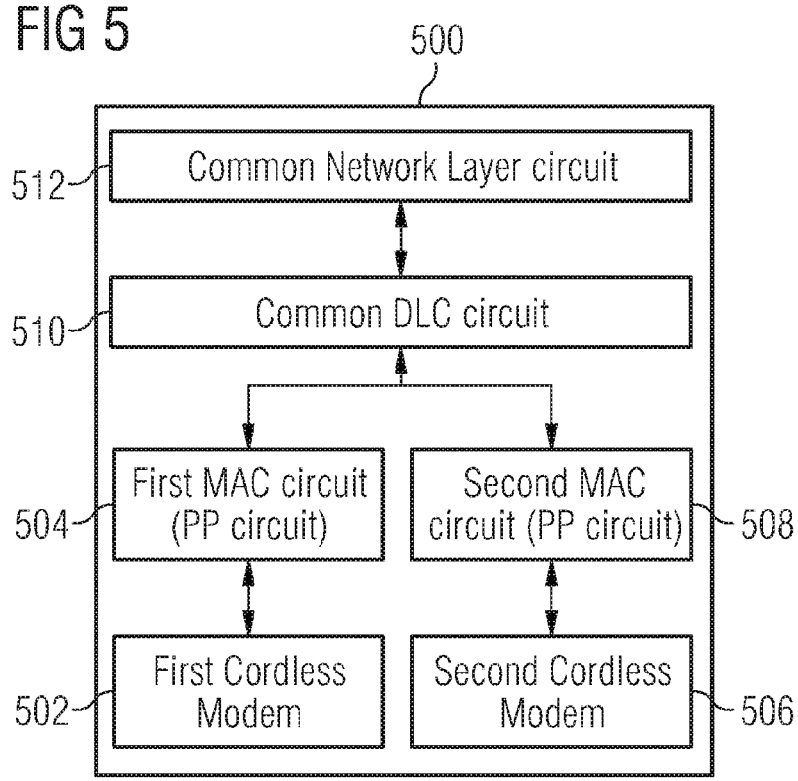

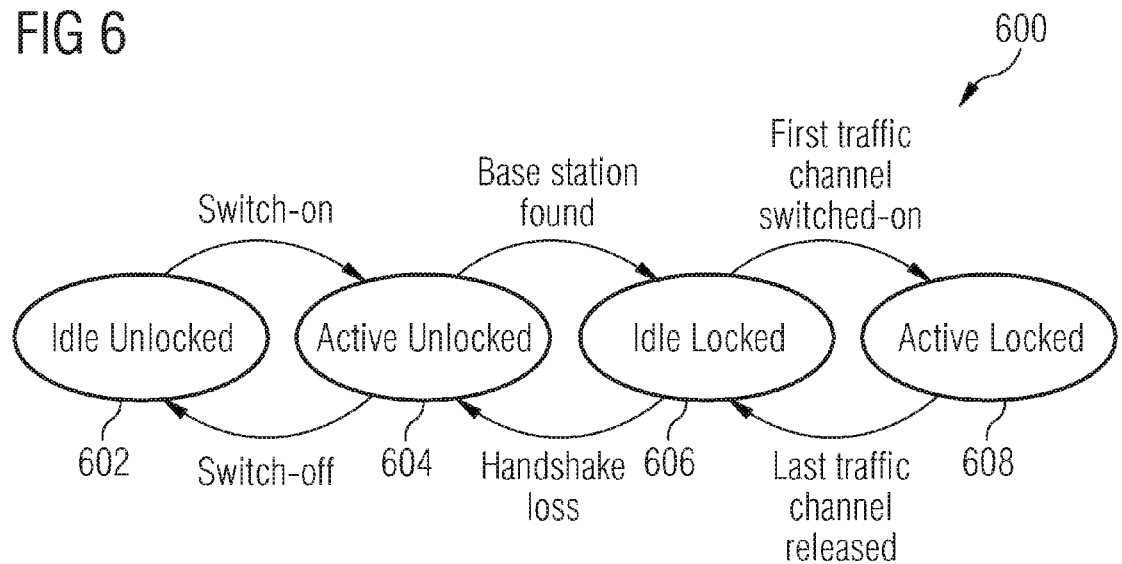
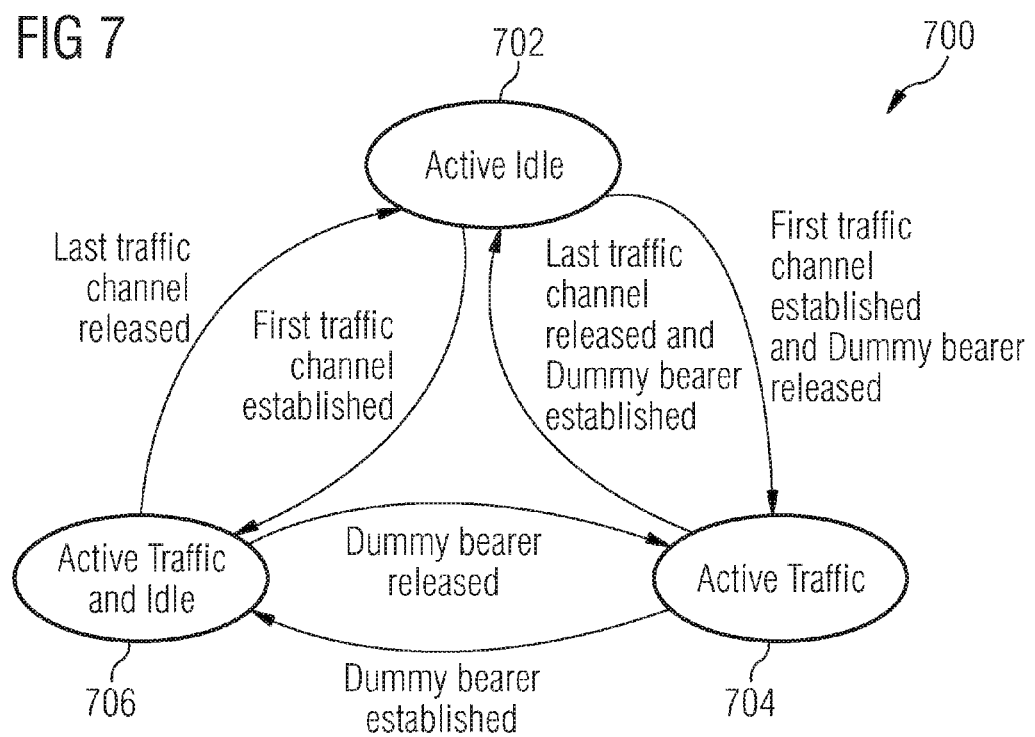

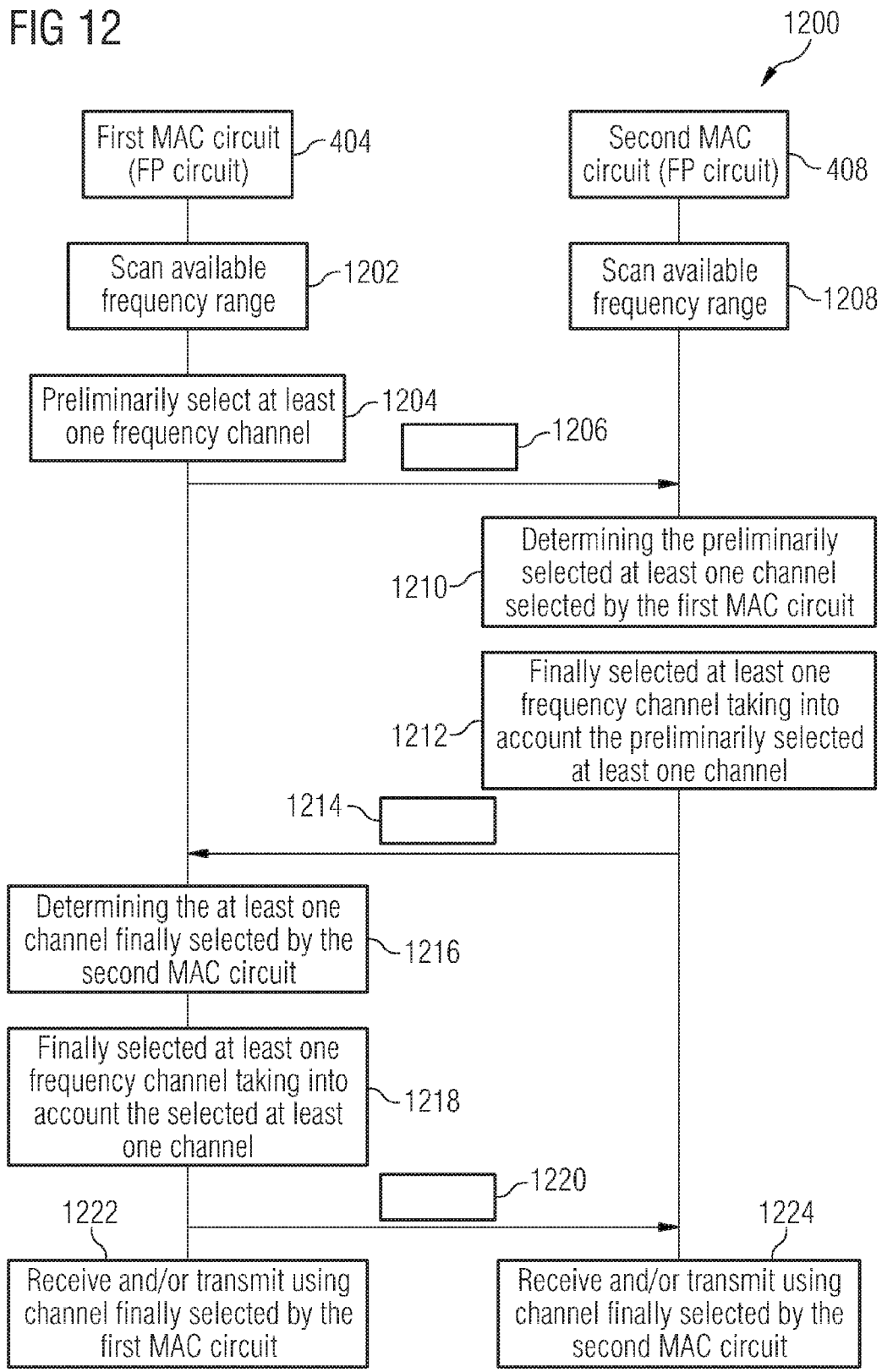

RADIO COMMUNICATION DEVICE AND METHOD FOR CONTROLLING FREQUENCY SELECTION

CROSS REFERENCE TO RELATED APPLICATION

This application is a continuation of U.S. patent application Ser. No. 11/876,234, which was filed Oct. 22, 2007. This application is incorporated herein by reference in its entirety.

TECHNICAL FIELD

Embodiments of the invention relate generally to radio communication devices and to a method for controlling frequency selection.

BACKGROUND

Various device profiles for the next generation of devices cordlessly coupled to the Internet are presently specified in the Digital Enhanced Cordless Telecommunication (DECT) forum. Exemplary basic profiles are those for speech communication (e.g. basic profile vb or profile ve) and for data communication (e.g. basic profile da). A conventional speech communication profile provides for three telephone calls in parallel, for example two external telephone calls and one internal telephone call, but also even more telephone calls, in broadband quality in accordance with ITU-T G.722. The data communication profile should allow a data rate of 358.4 kbit/s in the downlink direction and a data rate of 44.8 kbit/s in the uplink direction for corresponding internet services.

The technical characteristics of DECT/CAT-iq (Cordless Advanced Technology-internet and quality) today allow either data systems or telephone systems to be flexible and inexpensive (for example by using inexpensive and simple to manufacture "blind slot" High Frequency (HF) frontends). The demand for devices with speech functionality as well as with data functionality is not or only insufficiently covered. By way of example, an internet radio with additional telephone functionality and hands-free speaking cannot be implemented without having an impact on the characteristics and performance of the above required profiles. Furthermore, it is desirable for economic reasons, to provide sufficient but not too many radio resources for the respective applications, and to remain the flexibility, interoperability and the costs for DECT/CAT-iq.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows a DECT reference model in accordance with one embodiment of the invention;

FIG. 4 shows a fixed station in accordance with one embodiment of the invention;

FIG. 5 shows a mobile station in accordance with one embodiment of the invention;

FIG. 6 shows the operation states of a medium access control circuit of a mobile station in accordance with one embodiment of the invention;

FIG. 7 shows the operation states of a medium access control circuit of a fixed station in accordance with one embodiment of the invention;

FIG. 12 shows a message flow diagram illustrating the message flow between two medium access control circuits in accordance with another embodiment of the invention.

DESCRIPTION

In an embodiment of the invention, a "circuit" may be understood as any kind of a logic implementing entity, which may be hardware, software, firmware, or any combination thereof. Thus, in an embodiment of the invention, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). As will be described in more detail below, a "circuit" may also be software being implemented or executed by a processor, e.g. any kind of computer program, e.g. a computer program using a virtual machine code such as e.g. Java. Any other kind of implementation of the respective functions which will be described in more detail below may also be understood as a "circuit" in accordance with an alternative embodiment of the invention.

The embodiments which will be described in more detail below refer to the radio communication devices as well as to the method for controlling frequency selection.

Figure 1:
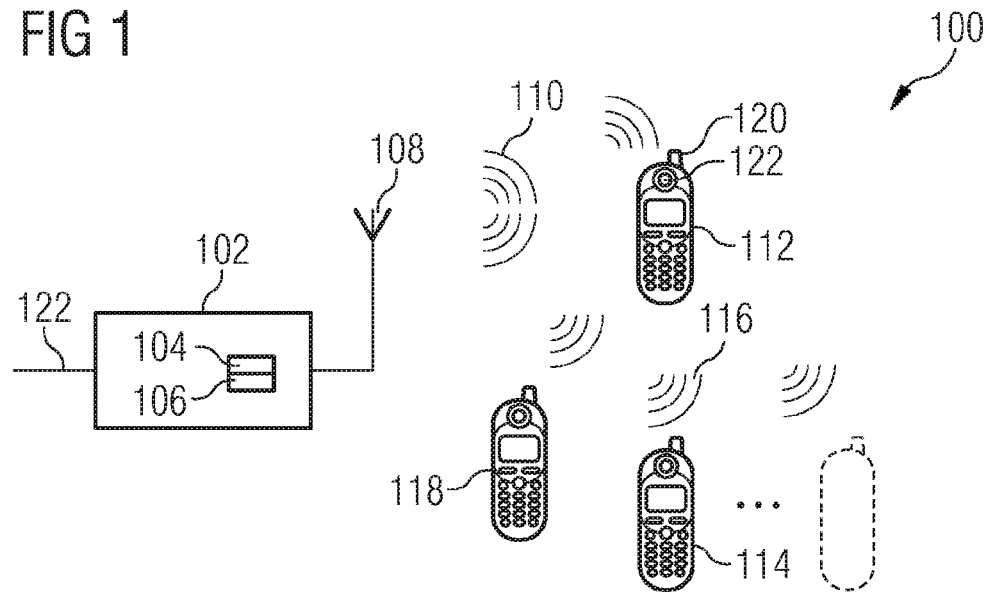
FIG. 1 shows an arrangement for digital radio transmission in accordance with one embodiment of the invention.

FIG. 1 shows an arrangement 100 for digital radio transmission in accordance with one embodiment of the invention.

In an embodiment of the invention, the arrangement 100 for digital radio transmission is configured in accordance with a cordless radio communication technology such as e.g. in accordance with one of the following cordless radio communication technologies:

Digital Enhanced Cordless Telecommunication (DECT);
Wideband Digital Enhanced Cordless Telecommunication (WDECT);
Cordless Telephony 2 (CT2);
Cordless Advanced Technology-internet and quality (CAT-iq).

In another embodiment of the invention, the arrangement 100 for digital radio transmission is configured in accordance with a mobile radio communication technology, e.g. in accordance with a Third Generation Partnership Project (3GPP) mobile radio communication technology. In an embodiment of the invention, the arrangement 100 for digital radio transmission is configured in accordance with one of the following Third Generation Partnership Project mobile radio communication technologies:

Universal Mobile Telecommunication System (UMTS) technology;
Code Division Multiple Access 2000 (CDMA2000) technology;

Freedom of Mobile Multimedia Access (FOMA) technology.

In an embodiment of the invention, a fixed station FS 102 (in the following also referred to as fixed part (FP)) is connected to a fixed network by way of a terminal line 122. In an embodiment of the invention, the fixed network may be for example a public switched telephone network (PSTN), an integrated services digital network (ISDN), a packet switched public data network (PSPDN), or a public land mobile network (PLMN).

As will be described in more detail below, the fixed station FS 102 includes a plurality (e.g. two) radio frequency (RF) modules 104, 106 (in the following also referred to as radio modem circuits), using which data can be transmitted and received by means of an antenna 108. The RF modules 104, 106 may be so-called slow hopping RF modules (in other words, particularly cost-effective RF modules) which intrinsically require a certain period of time to change from one carrier frequency to another. This time period, which is required for the carrier frequency change, may correspond, for example, to the time period which is filled by one time slot in a time division multiplex method (e.g. a time division multiple access method (TDMA)). By way of the antenna 108, a radio transmission may be made via a radio transmission path 110 to a first mobile station MS 112 (in the following also referred to as portable part), or a radio transmission may be made to a second mobile station MS 114 via a second radio transmission path 116. All of the mobile stations MS 112, 114, 118 illustrated in FIG. 1 may be of the same design, so that a more detailed explanation will be given only on the basis of the first mobile station MS 112.

As can be seen in FIG. 1, the first mobile station MS 112 has an antenna 120 for receiving and for transmitting data from and, respectively, to the fixed station FS 102. The first mobile station MS 112 may include one RF module or a plurality of RF modules 122, as will be described in more detail below. In an embodiment of the invention, the one RF module or the plurality of RF modules 122 essentially correspond to the RF modules 104, 106 provided in the fixed station FS 102. The one or the plurality of RF modules 122 may thus also be one or a plurality of slow hopping RF modules 122.

Figure 2:
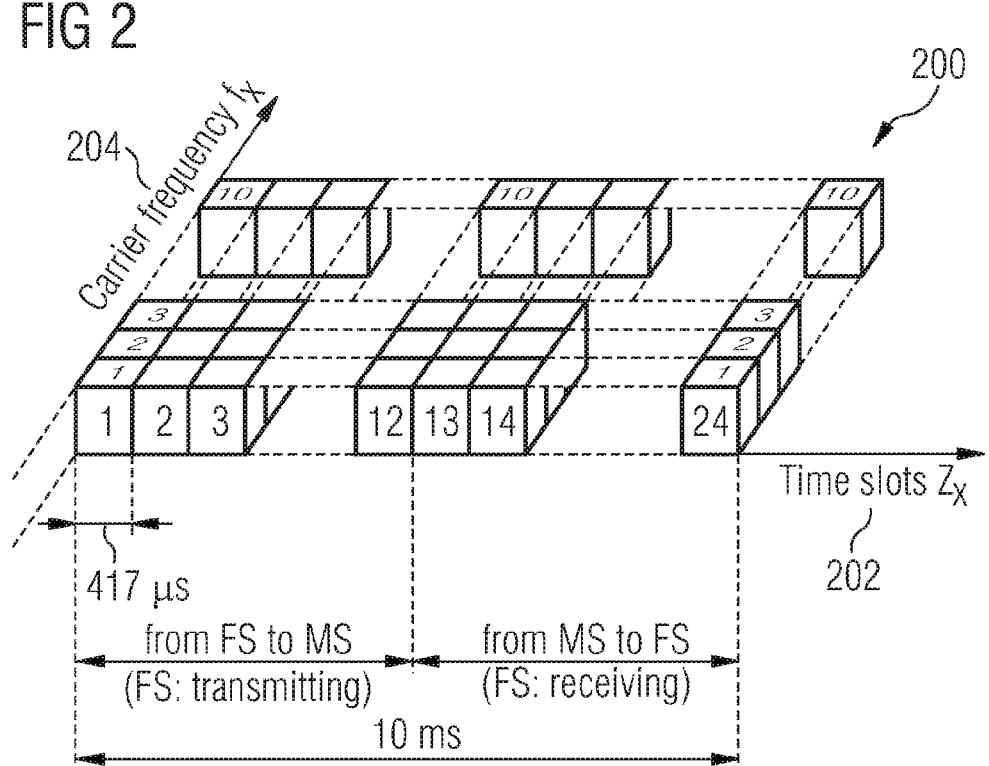
FIG. 2 shows a timing/frequency diagram of DECT in accordance with one embodiment of the invention.

FIG. 2 shows a timing/frequency diagram 200 of DECT in accordance with one embodiment of the invention.

In an embodiment of the invention, a DECT network is a microcellular, digital cordless radio network for high subscriber densities, and, is primarily designed for use in buildings. However, it is also possible to use the arrangements in accordance with various embodiments of the invention outdoors. The capacity of the DECT network of around 10,000 subscribers per square kilometer provides, from the cordless standard, ideal access technology for network operators.

According to the DECT technology, it is possible to transmit both voice signals (in the following also referred to as speech communication) and data signals (in the following also referred to as data communication). Thus, cordless networks can also be built on a DECT base.

Thus, in general, in an embodiment of the invention, speech signals or data signals (e.g. multimedia signals including at least one of the following type of signals: audio signals, image signals, video signals, textual data signal, etc.) may be transmitted and/or received.

The DECT technology will be explained in more detail below with reference to FIG. 2.

A digital, cordless telecommunications system for ranges of less than 300 m has been standardized for Europe under the designation DECT. In conjunction with the switching function of a telecommunications installation, this system is therefore suitable for a mobile telephone and data traffic in an office building or on a commercial site. The DECT functions supplement a telecommunications installation, and thus make it the fixed station FS 102 of the cordless telecommunications system.

A conventional DECT system is based on the MC/TDMA/TDD (Multi-Carrier/Time Division Multiple Access/Time Division Duplex) principle and could use in the time multiplex 240 channels altogether in time and frequency. The so-called dynamic channel selection (DCS) and allocation provides for that the mobile station MS 112, 114, 118 always searches for the best connection. In this case, conventionally, all possible channels are scanned at least once every 30 seconds and an RSSI (Receive Signal Strength Indicator) list is generated for each free combination time slot/carrier. Using the RSSI list, the fixed station FS 102 and the mobile stations MS 112, 114, 118 are able to select an optimal channel for the transmission.

As shown in the timing/frequency diagram 200 of FIG. 2, a maximum of ten different carrier frequencies (carriers) 204 may be used for transmission in the frequency range from 1.88 GHz to 1.9 GHz in accordance with one embodiment of the invention. This frequency division multiplex method is called FDMA (Frequency Division Multiple Access).

In an embodiment of the invention, twelve channels may be transmitted successively in time on each of the ten carrier frequencies using the time division multiplex method TDMA (Time Division Multiple Access). Cordless telecommunication in accordance with the DECT standard using ten carrier frequencies with twelve channels per carrier frequency provides a total of 120 channels. Since one channel is required, for example, for each voice link, there are 120 links to the maximum of 120 mobile stations MS 112, 114, 118. In an embodiment of the invention, the time division duplex method (TDD) is used on the carriers. After the twelve channels (1 to 12) have been transmitted, the system switches to receive, and the twelve channels (13 to 24) in the opposite direction are received.

A time-division multiplex frame in one embodiment of the invention thus comprises 24 channels (see FIG. 2). Channel 1 to channel 12 are transmitted from the fixed station FS 102 to the mobile station MS 112, 114, 118, while channel 13 to channel 24 are transmitted in the opposite direction, from the mobile station MS 112, 114, 118 to the fixed station FS 102. In an embodiment of the invention, the frame duration is 10 ms. Furthermore, in an embodiment of the invention, the duration of a channel (also referred to as time slot) is 417 µs. By way of example, 320 bits of information (for example voice signal bits) and 100 bits of control data (synchronization, signaling and error check) are transmitted in this time. The useful bit rate for a subscriber (channel) of 32 Kbit/s results from the 320 bits of information within 10 ms.

In an embodiment of the invention, when the mobile station MS 112, 114, 118 is first switched on, it searches for fixed station identifications it is aware of on all channels, and then usually selects the channel with the highest signal strength. A mobile station MS 112, 114, 118 which is assigned to a channel continues to monitor all other channels in order to determine as to whether another channel which is better suitable for transmission, exists. In case the mobile station MS 112, 114, 118 determines a better suitable channel, it will change to this one. Conventionally, 12 time slots can be used for a system at maximum. In case that inexpensive and simple to manufacture "blind slot" High Frequency (HF) frontends are used, even only 6 time slots can be used.

The conventional single cell and multi cell systems use base stations only for speech telephone calls. If the base station should implement a data profile and at the same time a speech profile in accordance with the requirements as requested above in parallel, this is not possible with a conventional system architecture. Conventionally, either the data rate for the data profile has to be reduced or the number of possible telephone calls in parallel using G.722 has to be reduced or has to be set to zero or the quality of the telephone calls has to be reduced by falling back using G.726, for example. This is shown in table 1 below. If the simple to manufacture "blind slot" High Frequency (HF) frontends are used even these fall back options are not possible due to the then necessary "blind slots".

TABLE 1

Possible channel combinations and its performance parameters for data telephony and speech telephony

| Data rate in kbit/s Downlink (FP > PP) | Uplink (PP > FP) | Number of channels Downlink (FP > PP) | Uplink (PP > FP) | Broadband calls Number | Number of channels |
| --- | --- | --- | --- | --- | --- |
| 358.4 | 44.8 | 7 | 1 | 2 | 4 |
| 256.0 | 44.8 | 5 | 1 | 3 | 6 |
| 153.6 | 44.8 | 3 | 1 | 4 | 8 |
| 51.2 | 51.2 | 1 | 1 | 5 | 10 |
| 0 | 0 | 0 | 0 | 6 | 12 |

Other conventional system architectures provide for the parallel operation of data applications on the basis of the so-called DECT Packet Radio Service (DPRS) and small band speech telephony using G.726, for example, but they need an extensive resource management for the time slots and they do not work without limitations of the performance parameters for the above-mentioned application scenarios neither with "blind slots" nor without "blind slots".

As will be described in more detail below, various embodiments of the invention provide an efficient use of all channels which exist in a radio communication system, for example in a cordless radio communication system such as DECT or WDECT or DECT/CAT-iq, e.g. for the operation in parallel of data applications having "stream" characteristics (e.g. internet radio, internet television or other streaming applications) and speech telephony.

FIG. 3 shows a DECT reference model 300 in accordance with one embodiment of the invention. In an embodiment of the invention, the respective functions provided by the layers of the DECT reference model 300 are provided by respectively configured circuits. The circuits implementing the DECT reference model 300 are provided in the fixed station (s) as well as in the mobile station(s). It should be mentioned that although the detailed embodiments described in the following refer to DECT, they are not limited thereto, but could analogously be applied to other radio communication systems such as e.g. the radio communication systems listed above.

The DECT reference model 300 is designed in accordance with the ISO/OSI reference model (International Organization for Standardization/Open System Interconnection). In the following, the DECT reference model 300 will be described in more detail with focus on the three lower layers, namely:
 a Physical Layer 302 (OSI Layer 1);
 a Data Link Layer (OSI Layer 2), being divided into a Medium Access Control (MAC) Layer 304 and a Data Link Control (DLC) Layer 306; and
 a Network Layer 308 (OSI Layer 3).

Above the MAC Layer 304, the functions of the layers are grouped into two sub-groups, wherein a first sub-group (also referred to as a Control Plane (C-Plane) 310) is provided for the signaling and a second sub-group (also referred to as a User Plane (U-Plane) 312) is provided for the transmission of the user data. The Network Layer 308 only processes control functions of the C-Plane 310, whereas the data of the U-Plane 312 are passed through without being processed.

In more detail, the Physical Layer 302 is provided for the realization of transmission channels via the radio medium. In this case, the Physical Layer 302 of a mobile station shares the medium with other mobile stations, which also transmit data. As described above, a TDMA-method and an FDMA-method and a Dynamic Channel Selection (DCS) method are provided for transmitting data.

The MAC Layer 304 is provided for establishing, operating and releasing channels (also referred to as bearer) for the higher layers. The different data fields of the MAC communication protocol are protected using cyclic codes which are used in the receiver for error recognition. The MAC Layer 304 provides for adding service-specific control data to each time slot.

In an embodiment of the invention, the MAC Layer 304 includes three groups of services:
 Broadcast Message Control (BMC) Service:
 The BMC Service is offered in each cell on at least one physical channel, even in case no subscriber transmits at all. Thus, a continuous connectionless point-to-multipoint connection originates at the downlink (i.e. for example in the transmission direction from the fixed station to the mobile station), in which the fixed station broadcasts its system-related data. This allows the mobile station(s) to identify the fixed station. At the same time, the terminal device (e.g. the mobile station) can determine the current channel quality by evaluating the received signal.
 Connectionless Message Control (CMC) Service:
 The CMC Service may support a connectionless point-to-point service or point-to-multipoint service, which may be operated between a fixed station and a mobile station in a bidirectional manner.
 Multi Bearer Control (MBC) Service:
 The MBC Service offers a connection-oriented point-to-point service. The entity transmitting in one or both directions may support a plurality of bearers, wherein a corresponding higher net data rate is achieved.

Each of these three services has an own independent Service Access Point (SAP) to the next higher layer, wherein the SAP can integrate a plurality of logical channels.

As previously described, above the MAC Layer 304, the provided communication protocol stack is divided into two parallel portions. Similar to the MAC Layer 304, a comprehensive error protection is carried out in the C-Plane 310 of the Data Link Control Layer 306, which improves the reliability of the data transmission. In addition to a point-to-point service, the C-Plane 310 of the Network Layer 308 arranged above the C-Plane portion of the Data Link Control Layer 306 offers a broadcast service. The U-Plane 312 provides the processing of the user data on the radio link. In this case, the service spectrum ranges from the transmission of unprotected data with little delay (e.g. speech data) to protected services with variable delay for data transmission. The requested data rate of an existing connection can be changed at any time.

In an embodiment of the invention, the Network Layer 308 establishes connections between the subscribers and the network, operates them and releases them. The U-Plane 312 of DECT usually has no tasks in the Network Layer 308 and forwards all data unprocessed in vertical direction. The C-Plane 310 carries out the signaling and is responsible for the control of the data exchange. To do this, five communication protocols are provided which build on the Link Control Entity. In addition a Call instance and a Connection instance, a service Mobility Management is provided, which takes over all the tasks required for the support of the mobility of the mobile stations. In addition to the data for the residence area management, also messages for the authentication as well as encryption data are transmitted.

The management of the Physical Layer 302, the Data Link Layer, and the Network Layer 308 are provided by a Lower Layer Management Entity 314. The Lower Layer Management Entity 314 initiates and controls e.g. the generation, maintenance and release of physical channels (bearers). Furthermore, the selection of a free physical channel and the quality evaluation of the receive signal may be carried out in the Lower Layer Management Entity 314.

In an embodiment of the invention, in the C-Plane 310, the Network Layer 308 provides services to one or more signaling applications 316 and/or to one or more interworking processes 318 (which may be arranged in an Application Layer). Furthermore, in an embodiment of the invention, in the U-Plane 312, the Network Layer 308 provides services to one or more application processes 320 (which may be arranged in an Application Layer).

As will be described in more detail below, in various embodiments of the invention, an integration of two or more base station functionalities (including the functionalities of the MAC Layer 304 and the Physical Layer 302), which are operated and work independently from one another, is provided, in a system for implementation of at least one speech profile as well as at least one data profile dedicated in respectively one of the base stations being integrated in one radio communication device. In an embodiment of the invention, thus, one independent base station circuit (including the functionalities of a first independent MAC Layer and a first independent Physical Layer) is provided to implement a speech communication profile (e.g. the speech communication profile vb or the speech communication profile ve or speech communication profiles for handsfree and conferencing) and another independent base station circuit (including the functionalities of a second independent MAC Layer and a second independent Physical Layer) is provided to implement a data communication profile (e.g. the data communication profile da or other data communication profiles terminating Internet either in the fixed station or mobile station).

In an embodiment of the invention, two or more cordless modems (e.g. two or more DECT modems) are provided in one common communication device, which are connected to the respective base station controller such as e.g. a circuit implementing the Lower Layer Management Entity 314 via a communication channel. Thus, in an embodiment of the invention, two or more real (i.e. for example implemented in hardware) or virtual (i.e. for example implemented in software, e.g. using a so-called Virtual Machine, e.g. a Java Virtual Machine) base stations, which are independent from each other, are implemented in one common device such as a radio communication device, wherein each base station implements only (exactly) one communication profile, respectively (e.g. a first base station to implement a speech communication profile and a second base station to implement a data communication profile). Thus, in an embodiment of the invention, one real base station or virtual base station exists for the speech communication profile and one real or virtual base station exists for the data communication profile. Accordingly, the mobile terminal devices (e.g. the mobile stations) are registered with the respective appropriate base station. The Dynamic Channel Selection (DCS) and the allocation between the real base stations or virtual base stations (e.g. implemented in one common fixed station) and one or more mobile stations runs corresponding to the respectively provided communication protocols of the respective communication layers.

Various embodiments of the invention have the following effects: the system can work with inexpensive cordless modems (such as e.g. DECT/CAT-iq modems) and can be fully Generic Access Profile (GAP) compatible (e.g. DECT-GAP compatible). In an embodiment of the invention, a Generic Access Profile (GAP) may be understood as being a transmission protocol for radio communication devices which allows the communication of radio communication devices from different manufacturers. By way of example, DECT-GAP may be understood as being a transmission protocol for cordless radio communication devices which allows the communication of cordless radio communication devices from different manufacturers. Thus, cordless radio communication devices from different manufacturers can be used together with one DECT-base station, since they all use the same transmission communication protocol. Even a solution (i.e. a radio communication device) with inexpensive and simple to manufacture "blind slot" High Frequency (HF) frontends is possible in accordance with various embodiments of the invention. The capability and the complexity of the profile characteristics fully remains. Furthermore, embodiments of the invention allow, for the first time, to support mobile devices (such as e.g. mobile stations) with all possible combinations of speech communication profiles and data communication profiles. Furthermore, in accordance with various embodiments of the invention, the available radio spectrum (e.g. the available DECT spectrum) is used more efficiently.

FIG. 4 shows a fixed station 400 as a radio communication device in accordance with one embodiment of the invention.

In an embodiment of the invention, the fixed station 400 includes a first radio modem circuit 402 (e.g. a first cordless radio modem circuit, e.g. a first DECT radio modem circuit) and a first medium access control (MAC) circuit 404 (e.g. a first cordless MAC circuit, e.g. a first DECT MAC circuit) (in one embodiment of the invention also referred to as a first fixed part circuit) assigned to the first radio modem circuit 402. Furthermore, the fixed station 400 may include a second radio modem circuit 406 (e.g. a second cordless radio modem circuit, e.g. a second DECT radio modem circuit) and a second medium access control (MAC) circuit 408 (e.g. a second cordless MAC circuit, e.g. a second DECT MAC circuit) (in one embodiment of the invention also referred to as a second fixed part circuit) assigned to the second radio modem circuit 406. In an embodiment of the invention, the first radio modem circuit 402 and the first MAC circuit 404 provide the base station functionalities for a first application such as for the transmission of speech (in other words, the first radio modem circuit 402 and the first MAC circuit 404 provide the base station functionalities for a speech communication profile), and the second radio modem circuit 406 and the second MAC circuit 408 provide the base station functionalities for a second application such as for the transmission of data (in other words, the second radio modem circuit 406 and the second MAC circuit 408 provide the base station functionalities for a data communication profile).

Thus, in an embodiment of the invention, applications which are orthogonal to each other such as e.g. data transmission and speech telephony are implemented in parallel, in other words, in one common radio communication device, e.g. using cordless technology (e.g. DECT/CAT-iq).

To do this, two or more fixed part functionalities, e.g. of the Physical Layer and of the MAC Layer, are integrated in reality (e.g. in hardware) or virtually (e.g. in software) in one base station including the corresponding number of cordless modems.

Thus, in an embodiment of the invention, the first radio modem circuit and the first medium access control circuit are configured to provide a connection-oriented communication profile (e.g. a speech communication profile, e.g. a speech communication basic profile, e.g. the speech communication basic profile ve or vb), and the second radio modem circuit and the second medium access control circuit are configured to provide packet-oriented communication profile (e.g. a data communication profile, e.g. a data communication basic profile, e.g. the data communication basic profile da).

In an embodiment of the invention, the fixed station 400 may further include one common DLC circuit 410, which is coupled with the first MAC circuit 404 and with the second MAC circuit 408, and one common Network Layer circuit 412, which is coupled with the common DLC circuit 410. The common DLC circuit 410 and/or the common Network Layer circuit 412 may form a control interface circuit configured to control the first medium access control circuit 404 and the second medium access control circuit 408. In an embodiment of the invention, the common DLC circuit 410 is configured to provide the functions of the DLC Layer 306 and the common Network Layer circuit 412 is configured to provide the functions of the Network Layer 308 for a fixed station.

FIG. 5 shows a mobile station 500 as a radio communication device in accordance with one embodiment of the invention. The mobile station 500 is provided for the parallel implementation of similar scenarios as described above for mobile terminal devices.

In an embodiment of the invention, the mobile station 500 includes a first radio modem circuit 502 (e.g. a first cordless radio modem circuit, e.g. a first DECT radio modem circuit) and a first medium access control (MAC) circuit 504 (e.g. a first cordless MAC circuit, e.g. a first DECT MAC circuit) (in one embodiment of the invention also referred to as a first portable part (PP) circuit) assigned to the first radio modem circuit 502. Furthermore, the mobile station 500 may include a second radio modem circuit 506 (e.g. a second cordless radio modem circuit, e.g. a second DECT radio modem circuit) and a second medium access control (MAC) circuit 508 (e.g. a second cordless MAC circuit, e.g. a second DECT MAC circuit) (in one embodiment of the invention also referred to as a second portable part (PP) circuit) assigned to the second radio modem circuit 506. In an embodiment of the invention, the first radio modem circuit 502 and the first MAC circuit 504 provide the portable part functionalities of layers 1 and 2 for a first application such as for the transmission of speech (in other words, the first radio modem circuit 502 and the first MAC circuit 504 provide the portable part functionalities of layers 1 and 2 for a speech communication profile), and the second radio modem circuit 506 and the second MAC circuit 508 provide the portable part functionalities of layers 1 and 2 for a second application such as for the transmission of data (in other words, the second radio modem circuit 506 and the second MAC circuit 508 provide the portable part functionalities of layers 1 and 2 for a data communication profile).

Thus, in an embodiment of the invention, applications which are orthogonal to each other such as e.g. data transmission and speech telephony are implemented in parallel, in other words, in one common portable radio communication device, e.g. using cordless technology (e.g. DECT/CAT-iq).

To do this, two or more portable part functionalities of layer 1 and 2, e.g. of the Physical Layer and of the MAC Layer, are integrated in reality (e.g. in hardware) or virtually (e.g. in software) in one base station including the corresponding number of cordless modems.

Thus, in an embodiment of the invention, the first radio modem circuit and the first medium access control circuit are configured to provide a connection-oriented communication profile (e.g. a speech communication profile, e.g. a speech communication basic profile, e.g. the speech communication basic profile ve or vb), and the second radio modem circuit and the second medium access control circuit are configured to provide packet-oriented communication profile (e.g. a data communication profile, e.g. a data communication basic profile, e.g. the data communication basic profile da).

In an embodiment of the invention, the mobile station 500 may further include one common DLC circuit 510, which is coupled with the first MAC circuit 504 and with the second MAC circuit 508, and one common Network Layer circuit 512, which is coupled with the common DLC circuit 510. The common DLC circuit 510 and/or the common Network Layer circuit 512 may form a control interface circuit configured to control the first medium access control circuit and the second medium access control circuit. In an embodiment of the invention, the common DLC circuit 510 is configured to provide the functions of the DLC Layer 306 and the common Network Layer circuit 512 is configured to provide the functions of the Network Layer 308 for a mobile station.

In an embodiment of the invention, the mobile station 500 having a plurality of communication profiles implemented in parallel (in other words, at the same time) may implement a dual mode including the implementation of a first portable part (PP) functionality according to DECT PP data transmission and a second portable part (PP) functionality according to DECT PP speech transmission. In another embodiment of the invention, the mobile station 500 may implement a multi mode including the implementation of a first portable part (PP) functionality according to DECT PP internet radio (thus illustratively implementing a PP internet radio communication profile), a second portable part (PP) functionality according to DECT PP speech telephony (thus illustratively implementing a PP speech communication profile), and a third portable part (PP) functionality according to DECT PP data transmission (thus illustratively implementing a PP data communication profile).

It should be mentioned, that any other combination of different communication profiles is possible in an alternative embodiment of the invention in one radio communication device.

FIG. 6 shows a diagram 600 illustrating the operation states of a medium access control circuit of a mobile station 112, 114, 118, in accordance with one embodiment of the invention.

The mobile station 112, 114, 118, may, related to the MAC Layer 304, be in one of the four states as shown in FIG. 6:

"Active Locked" (Symbolized in FIG. 6 with Reference Numeral 608):

The synchronized mobile station has at least one connection to one base station (fixed station) or to a plurality of base stations (fixed stations).

"Idle Locked" (Symbolized in FIG. 6 with Reference Numeral 606):

The mobile station is synchronized with at least one base station (fixed station). Currently, the mobile station has no connection, however, it is capable to receive requests for connections.

"Active Unlocked" (Symbolized in FIG. 6 with Reference Numeral 604):

The mobile station is not synchronized to any base station (fixed station) and therefore cannot receive any connection requests. It tries to find an appropriate base station (fixed station) in order to change into the state "Idle Locked" by a synchronization.

"Idle Unlocked" (Symbolized in FIG. 6 with Reference Numeral 602):

The mobile station is not synchronized to any base station (fixed station) and cannot detect appropriate base stations (fixed stations).

In case the radio communication terminal device such as e.g. the mobile station 112, 114, 118, is switched-off, it is in the state "Idle Unlocked" 602. During the switch-on, the radio communication terminal device changes its state into the state "Active Unlocked" 604. The radio communication terminal device starts to search for an appropriate base station with which it can synchronize. If this is successful, the state "Idle Locked" 606 is taken. In this state, the radio communication terminal device can receive or transmit connection requests. If the first traffic channel is established, it changes its state into the state "Active Locked" 608. If, in this state, the last traffic channel is released after the termination of the connection, the radio communication terminal device returns again into the state "Idle Locked" 606. If the radio communication terminal device looses the synchronization to its assigned base station, it returns to the state "Active Unlocked" 604 and searches for a new appropriate base station. If the radio communication terminal device is switched-off, it returns to the state "Idle Unlocked".

FIG. 7 shows a diagram 700 illustrating the operation states of a medium access control circuit of a fixed station 102 in accordance with one embodiment of the invention.

The fixed station 102 may, related to the MAC Layer 304, be in one of the four states as shown in FIG. 7 (the state "Inactive", in which the fixed station is switched-off, is not shown in FIG. 7):

"Inactive":

The fixed station is switched-off and can neither receive nor transmit messages.

"Active Idle" (Symbolized in FIG. 7 with Reference Numeral 702):

The fixed station does not operate a traffic channel (also referred to as traffic bearer) and therefore transmits a dummy bearer which the receiver can detect when monitoring the physical channels.

"Active Traffic" (Symbolized in FIG. 7 with Reference Numeral 704):

The fixed station operates at least one traffic channel (also referred to as traffic bearer). The dummy bearer is no longer transmitted.

"Active Traffic and Idle" (Symbolized in FIG. 7 with Reference Numeral 706):

In addition to at least one traffic channel (also referred to as traffic bearer), the fixed station also supports one dummy bearer.

In the base state "Active Idle" 702, the fixed station transmits a dummy bearer in order to allow mobile stations to synchronize themselves to their frame clock and slot clock. If a traffic bearer is established, the fixed station changes its state into the state "Active Traffic" 704. In this case, the dummy bearer may be dropped. The opposite change of state occurs after the release of the last traffic bearer. If during the transmission of the traffic bearer a dummy channel becomes necessary, the fixed station can change into the state "Active Traffic and Idle" 706. During the establishment of the first traffic bearer, the dummy bearer may also be kept. In this case, a change occurs from the state "Active Idle" 702 into the state "Active Traffic and Idle" 706.

Figure 8:
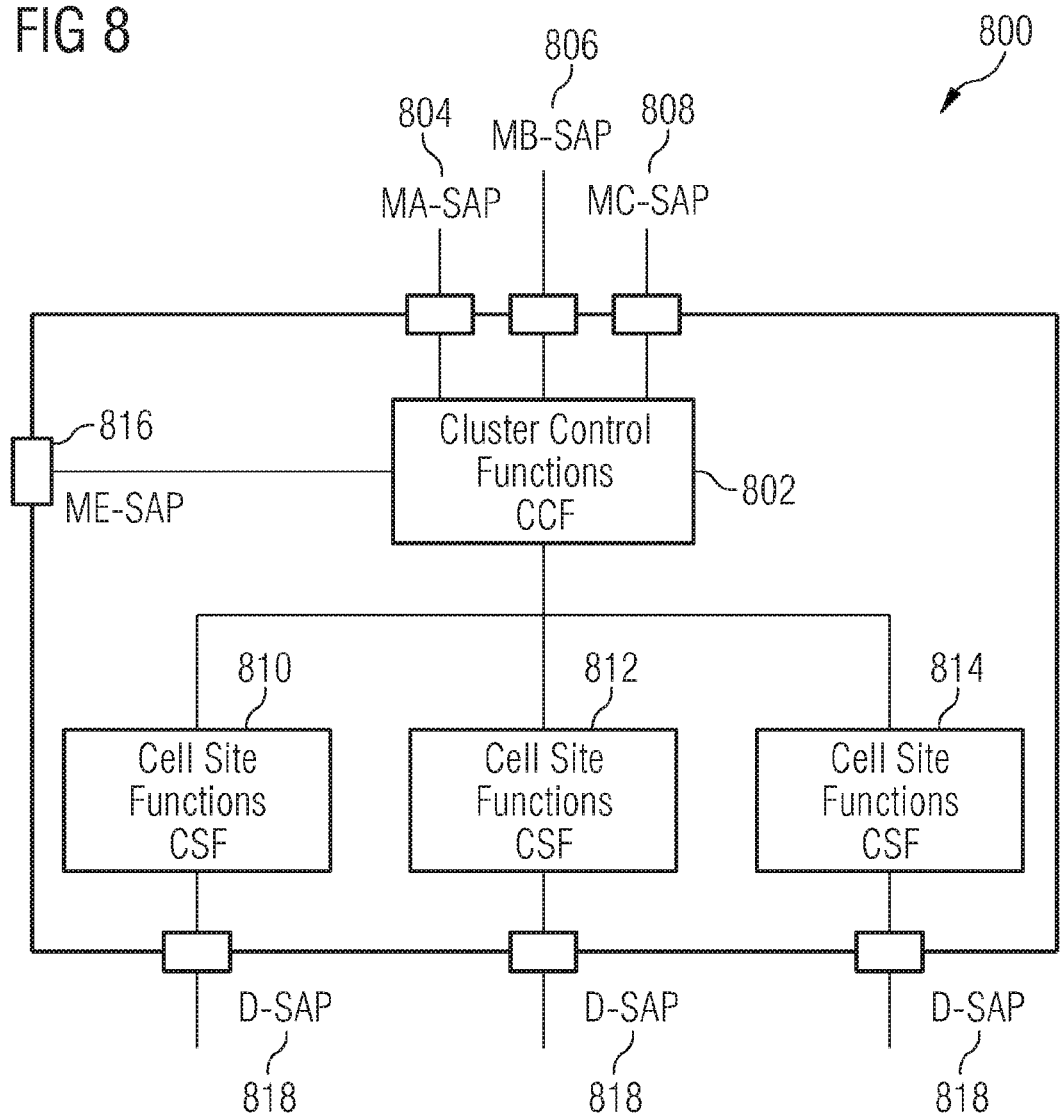
FIG. 8 shows a medium access control circuit and its provided services in accordance with one embodiment of the invention.

FIG. 8 shows a medium access control circuit 800 and its provided services in accordance with one embodiment of the invention. The medium access control circuit 800 may be provided in a fixed station as well as in a mobile station in accordance with an embodiment of the invention.

As already mentioned above, the medium access control circuit 800 implements the functionalities of the MAC Layer 804 and thus serves to establish and to maintain traffic bearers requested by the Lower Layer Management Entity 314 and to release the traffic bearers upon request of the Lower Layer Management Entity 314.

The control information which is introduced into the medium access control circuit 800 via the various Service Access Points are added to the actual user data in each time slot by means of multiplexing.

The various services of the MAC Layer 304 are divided into two groups, as shown in FIG. 8. The functions for controlling a cell cluster are provided by a Cluster Control Functions circuit 802 are connected to the Data Link Control Layer 306 via three Service Access Points MA (MA-SAP 804), MB (MB-SAP 806), and MC (MC-SAP 808). The cell specific functions are provided by respective Cell Site Functions circuit 810, 812, 814 and coordinate the transition to the Physical Layer 302.

In an embodiment of the invention, the two groups may provide the following individual functions:

Cluster Control Functions (CCF):

They control a cluster of cells. Each logic cluster of cells includes respectively only one CCF, which controls the entire cell functions (CSF). Within this cluster, the following three independent services may be provided:

Broadcast Message Control (BMC):

This function exists only once in each CCF and controls or distributes the cluster broadcast information to the respective cell functions. The BMC supports a plurality of connectionless point-to-multipoint services, which are directed from the fixed station to the mobile station. The BMC works with any type of traffic bearer. By way of example, one service may be the paging of the mobile station.

Connectionless Message Control (CMC):

All information, which relate to the connectionless service, are controlled from usually one CMC in each CCF. The CMC offers in addition to the transmission of information from the control plane 310 of the DLC Layer 306 also the processing of user data form the user plane 312. The services may be operated in both directions.

Multi Bearer Control (MBC):

This service includes the management of all data, which are exchanged between two corresponding MAC Layers 302. One MBC may exist for each connection-oriented point-to-point connection which can organize a plurality of traffic bearers.

Cell Site Functions (CSF):

These services are arranged below the CCF services in the MAC Layer 302 and represent the respective cell. Each CCF thus controls a plurality of CSFs. The following cell-oriented services may be distinguished:

Connectionless Bearer Control (CBC):

Each connectionless bearer within the CSF is controlled by an own CBC.

Dummy Bearer Control (DBC):

Two dummy bearers at maximum exist in each CSF in order to implement a beacon function so that mobile stations can synchronize themselves in case that no subscriber connection exists in the cell.

Traffic Bearer Control (TBC):

An MBC should request a TBC for a duplex connection.

Idle Receiver Control (IRC):

This service controls a receiver of the cell in case it does not operate a connection to a subscriber; it is possible that a cell has a plurality of receivers, in which case there are the a plurality of IRC services.

As shown in FIG. 8, an ME-SAP (management entity service access point) 816, which communicates between lower layer and other layers, is provided. Furthermore, D-SAPs 818 are provided for connection to the respective Physical Layer 302, e.g. the respective DECT modem.

Thus, in an embodiment of the invention, the functions of the MAC Layer 304 and of the Physical Layer 302 each are provided a plurality of times in a communication device, e.g. a fixed station or a mobile station, wherein at least one of the functions of the MAC Layer 304 and/or of the Physical Layer 302 may be implemented in hardware and/or in software.

Figure 9:
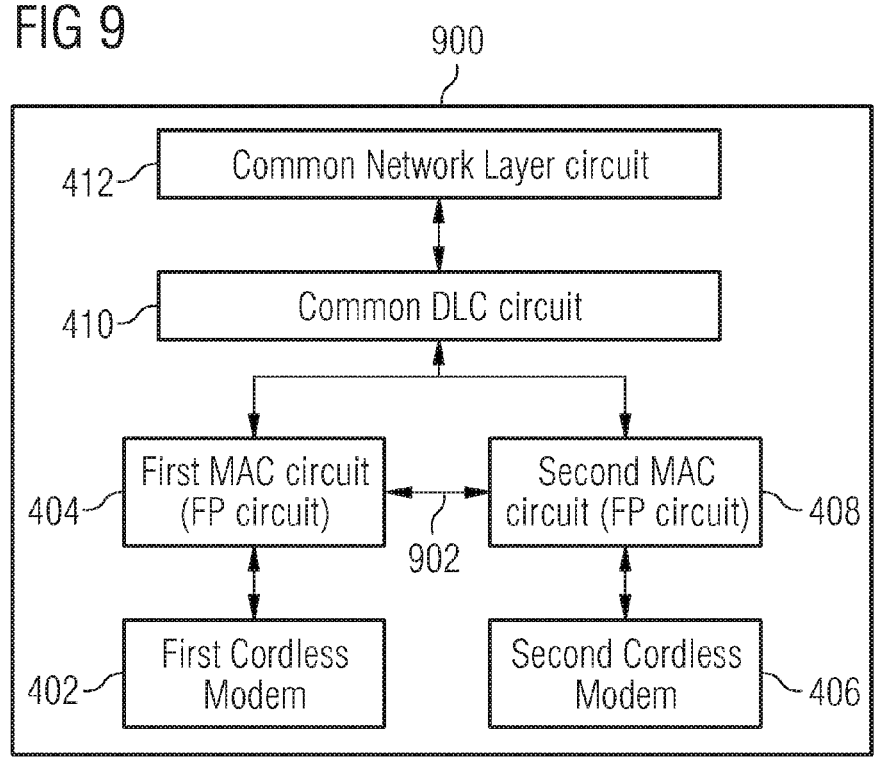
FIG. 9 shows a fixed station in accordance with another embodiment of the invention.

FIG. 9 shows a fixed station 900 in accordance with another embodiment of the invention. The fixed station 900 of FIG. 9 is similar to the fixed station 400 of FIG. 4 with the differences being outlined below.

In these embodiments, in addition to the implementation of two or more base station functionalities in one radio communication device, a communication interface 902 (in the following also referred to as control interface) is provided as well as an associated communication protocol (in the following also referred to as control communication protocol) for the coordination of the two or more base station functionalities (in other words, of the two or more base station modules), wherein also in these embodiments, the respective profiles such as e.g. one speech communication profile and one data communication profile, are dedicately implemented in one respective base station functionality (e.g. in one respective MAC circuit). In an embodiment of the invention, as in the embodiments described above, the radio communication device such as e.g. the fixed station 900 includes two or more radio modem circuits 402 and 406 (e.g. two or more cordless radio modem circuits, e.g. two or more DECT radio modem circuits), which are connected to the common base station controller (e.g. implemented by the common DLC circuit 410 and/or the common Network Layer circuit 412) via a communication channel. In this case, the common base station controller, which may be implemented in hardware and/or in software (in general, in reality and/or virtually), implements a distribution communication protocol which, in accordance with an embodiment of the invention, supports the exchange of an allocation table before and/or during the communication connection with a mobile station. In an embodiment of the invention, the exchange of data for frequency selection or frequency control using the distribution communication protocol is carried out as will be described in more detail below.

In other words, illustratively, in an embodiment of the invention, a communication interface configured for communication between the first medium access control circuit and the second medium access control circuit is provided. The communication interface may be configured for frequency control communication or frequency selection communication between the first medium access control circuit and the second medium access control circuit.

In an embodiment of the invention, the fixed station 900 may be a gateway, which virtually implements the integration of two or more fixed part (FP) functionalities, e.g. a first fixed part (FP) functionality according to DECT FP data transmission and a second fixed part (FP) functionality according to DECT FP speech transmission.

One effect of this embodiment can be seen in that the channel allocation between the real base stations and the virtual base station (synchronization of the time frames) in this case is carried out very fast, since the channel allocation is predetermined. The capabilities and the complexity of the profile characteristics also in this case fully remain.

Figure 10:
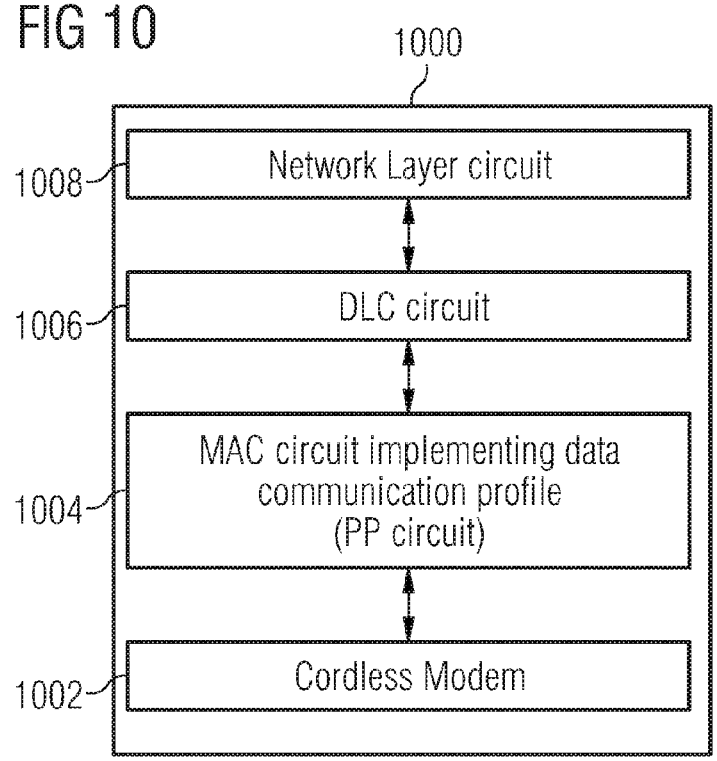
FIG. 10 shows a mobile station in accordance with another embodiment of the invention.

FIG. 10 shows a mobile station 1000 in accordance with another embodiment of the invention.

In an embodiment of the invention, the mobile station 1000 includes a radio modem circuit 1002 (e.g. a cordless radio modem circuit, e.g. a DECT radio modem circuit) and a medium access control (MAC) circuit 1004 (e.g. a cordless MAC circuit, e.g. a DECT MAC circuit) (in one embodiment of the invention also referred to as a portable part (PP) circuit) assigned to the first radio modem circuit 1002. In this embodiment of the invention, the MAC circuit 1004 implements a data communication profile such as e.g. the data communication profile da.

In an embodiment of the invention, the radio modem circuit 1002 and the MAC circuit 1004 provide the portable part functionalities of layers 1 and 2 for a first application such as for the transmission of data (in other words, the radio modem circuit 1002 and the MAC circuit 1004 provide the portable part functionalities of layers 1 and 2 for a data communication profile). Thus, the mobile station 1000 implements only one communication profile.

In an embodiment of the invention, the fixed station 1000 may further include one DLC circuit 1006, which is coupled with the MAC circuit 1004, and one Network Layer circuit 1008, which is coupled with the DLC circuit 1006. The DLC circuit 1006 and/or the Network Layer circuit 1008 may form a control interface circuit configured to control the medium access control circuit. In an embodiment of the invention, the DLC circuit 1006 is configured to provide the functions of the DLC Layer 306 and the Network Layer circuit 1008 is configured to provide the functions of the Network Layer 308 for the mobile station 1000.

Figure 11:
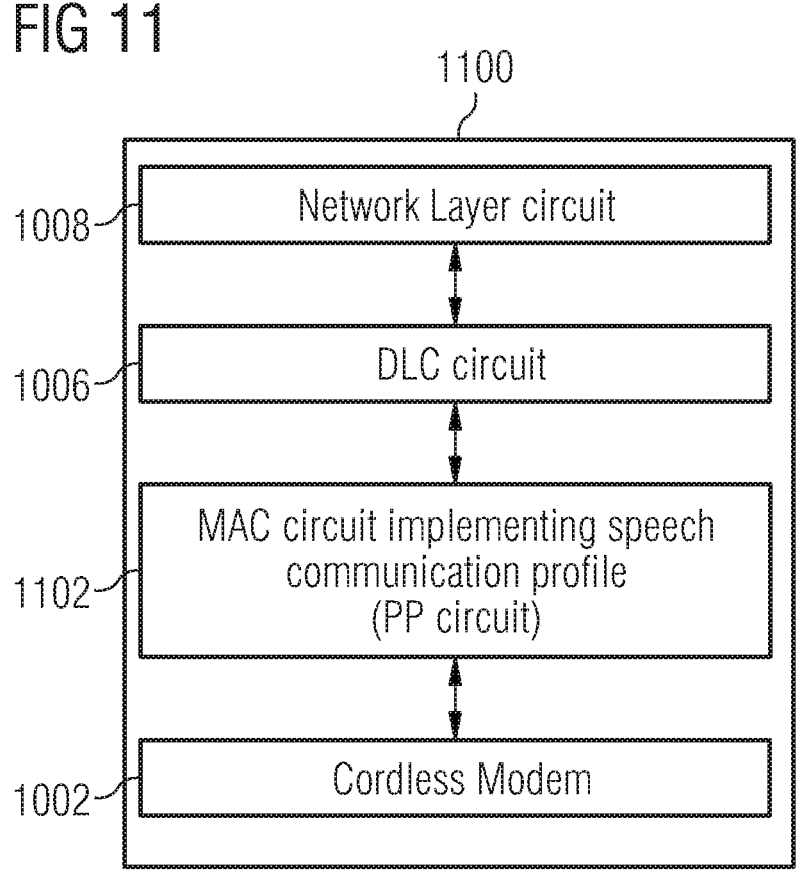
FIG. 11 shows a mobile station in accordance with another embodiment of the invention.

FIG. 11 shows a mobile station 1100 in accordance with another embodiment of the invention.

In an embodiment of the invention, the mobile station 1100 is similar to the mobile station 1000 of FIG. 10 with the difference that the medium access control (MAC) circuit 1102 (e.g. a cordless MAC circuit, e.g. a DECT MAC circuit) (in one embodiment of the invention also referred to as a portable part (PP) circuit) implements a speech communication profile such as e.g. the speech communication profile vb or the speech communication profile ve.

Thus, mobile communication terminal devices such as e.g. the mobile station 1000 of FIG. 10 or the mobile station 1100 of FIG. 11 providing only one communication profile (e.g. either a speech communication profile or a data communication profile) register with the respective corresponding real or virtual base station. In case that a plurality of communication profiles should be implemented in parallel in one mobile communication terminal device, in an embodiment of the invention, a similar architecture is provided as for the base station but with the functionalities of a mobile communication terminal device.

FIG. 12 shows a message flow diagram 1200 illustrating the message flow between two medium access control circuits in accordance with an embodiment of the invention.

As shown in FIG. 12, in 1202, the first MAC circuit 404 scans the available frequency range to determine all suitable frequency channels that it can use for transmitting and/or receiving signals (e.g. speech or data). Then, in 1204, the first MAC circuit 404 preliminarily selects at least one frequency channel. Then, it generates a first frequency control message 1206 including the at least one frequency channel. In an embodiment of the invention, a plurality of suitable frequency channels may be preliminarily selected and inserted into the first frequency control message 1206, e.g. in form of a list.

The first frequency control message 1206 is then transmitted from the first MAC circuit 404 to the second MAC circuit 408, e.g. via the communication interface 902.

Furthermore, in 1208, the second MAC circuit 408 scans the available frequency range to determine all suitable frequency channels that it can use for transmitting and/or receiving signals (e.g. speech or data). In various embodiments of the invention, the second MAC circuit 408 may carry out process 1208 before or after the sending or the receiving of the first frequency control message 1206.

After having received the first frequency control message 1206, the second MAC circuit 408 in 1210 determines the at least one frequency channel that has been preliminarily selected by the first MAC circuit 404. This can be carried out by appropriately decoding and parsing the received first frequency control message 1206. Then, in 1212, the second MAC circuit 408 finally selects at least one frequency channel taking into account the at least one frequency channel that has been preliminarily selected by the first MAC circuit 404. In an embodiment of the invention, the second MAC circuit 408 may compare the determined available frequency channels with the at least one frequency channel that has been preliminarily selected by the first MAC circuit 404 and finally selects at least one frequency channel which is not identical or not too similar with the at least one frequency channel that has been preliminarily selected by the first MAC circuit 404. Then, it generates a second frequency control message 1214 including the at least one finally selected frequency channel. In an embodiment of the invention, a plurality of suitable frequency channels may be finally selected and inserted into the second frequency control message 1214, e.g. in form of a list.

The second frequency control message 1214 is then transmitted from the second MAC circuit 408 to the first MAC circuit 404, e.g. via the communication interface 902.

After having received the second frequency control message 1214, the first MAC circuit 404 in 1216 determines the at least one frequency channel that has been finally selected by the second MAC circuit 408. This can be carried out by appropriately decoding and parsing the received second frequency control message 1214.

Then, in 1218, the first MAC circuit 404 finally selects at least one frequency channel taking into account the at least one frequency channel that has been finally selected by the second MAC circuit 408. In an embodiment of the invention, the first MAC circuit 404 may compare his preliminarily selected frequency channels with the at least one frequency channel that has been finally selected by the second MAC circuit 408 and finally selects at least one frequency channel which is not identical or not too similar with the at least one frequency channel that has been finally selected by the second MAC circuit 408. Then, it generates a third frequency control message 1220 including the at least one frequency channel finally selected by the first MAC circuit 404. In an embodiment of the invention, a plurality of suitable frequency channels may be finally selected and inserted into the third frequency control message 1220, e.g. in form of a list.

Furthermore, in 1222, the first MAC circuit 404 receives and/or transmits signals (e.g. speech or data) using the at least one channel finally selected by the first MAC circuit 404.

After having received the third frequency control message 1220, the second MAC circuit 408 in 1224 receives and/or transmits signals (e.g. speech or data) using the at least one channel finally selected by the second MAC circuit 408.

It should be mentioned that the communication interface 902 and the corresponding communication protocol can be varied depending on the circumstances.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device, comprising:
   a first medium access control unit;
   a second medium access control unit;
   a common scheduling circuit configured to control the first medium access control unit and the second medium access control unit; and
   a communication interface configured for frequency selection communication between the first medium access control unit and the second medium access control unit, wherein at least one frequency channel to be used is exchanged between the first medium access control unit and the second medium access control unit.

2. The radio communication device of claim 1, further comprising:
   a first radio modem unit, to which the first medium access control unit assigned, and
   a second radio modem unit, to which the second medium access control unit assigned.

3. The radio communication device of claim 1, wherein the communication interface is further configured for frequency control communication between the first medium access control unit and the second medium access control unit.

4. The radio communication device of claim 2,
   wherein the first radio modem unit and the first medium access control unit are configured to provide a connection-oriented communication profile; and
   wherein the second radio modem unit and the second medium access control unit are configured for packet-oriented communication profile.

5. The radio communication device of claim 4,
   wherein the first radio modem unit and the first medium access control unit are configured to provide a speech communication profile; and
   wherein the second radio modem unit and the second medium access control unit are configured for data communication profile.

6. The radio communication device of claim 1, wherein the radio communication device is configured in accordance with a mobile radio communication technology.

7. The radio communication device of claim 6, wherein the radio communication device is configured in accordance with a Third Generation Partnership Project mobile radio communication technology.

8. The radio communication device of claim 1, wherein the radio communication device is a radio communication mobile device.

9. The radio communication device of claim 8, wherein the radio communication mobile device is a radio communication terminal device.

10. The radio communication device of claim 1, wherein the common scheduling circuit is composed of at least one of a common Data Link Control circuit and a common Network Layer circuit.

11. A base station, comprising:
a first medium access control unit;
a second medium access control unit;
a common scheduling circuit configured to control the first medium access control unit and the second medium access control unit; and
a communication interface configured for frequency selection communication between the first medium access control unit and the second medium access control unit, wherein at least one frequency channel to be used is exchanged between the first medium access control unit and the second medium access control unit.

12. The base station of claim 11, further comprising:
a first radio modem unit, to which the first medium access control unit assigned, and
a second radio modem unit, to which the second medium access control unit assigned.

13. The base station of claim 11, wherein the communication interface is further configured for frequency control communication between the first medium access control unit and the second medium access control unit.

14. The base station of claim 11, wherein the base station is configured in accordance with a Third Generation Partnership Project mobile radio communication technology.

15. The base station of claim 11, wherein the common scheduling circuit comprises at least one of a common Data Link Control unit and a common Network Layer unit.

16. A method for controlling frequency selection, the method comprising:
selecting at least one frequency channel to be used by a first medium access control unit of a communication device; and
exchanging the at least one frequency channel to be used between the first medium access control unit and a second medium access control unit of the communication device.

17. The radio communication device of claim 1, wherein the common scheduling circuit comprises a processor configured to control the first medium access control unit and the second medium access control unit.

* * * * *